United States Patent
Ebert et al.

(10) Patent No.: US 8,167,519 B2
(45) Date of Patent: May 1, 2012

(54) PORTABLE CORING MACHINE

(75) Inventors: Andrew R. Ebert, Holland, PA (US); Peter Ebert, Holland, PA (US); Frederick Engel, Jr., Philadelphia, PA (US); Edward Lounsberry, Zionsville, PA (US)

(73) Assignee: MECO Constructors, Inc., Bensalem, PA (US)

( * ) Notice: Subject to any disclaimer, the term of this patent is extended or adjusted under 35 U.S.C. 154(b) by 1079 days.

(21) Appl. No.: 12/077,411

(22) Filed: Mar. 18, 2008

(65) Prior Publication Data
US 2009/0238652 A1 Sep. 24, 2009

(51) Int. Cl.
*B23B 41/08* (2006.01)
*B23B 45/14* (2006.01)

(52) U.S. Cl. .......... 408/95; 408/110; 408/124; 408/130; 408/136; 173/185; 175/122; 175/162; 175/220

(58) Field of Classification Search .......... 408/92, 408/95, 98, 97, 110–112, 124, 129, 130, 408/136, 8, 61; 175/122, 162, 170, 220; 173/185–186
See application file for complete search history.

(56) References Cited

U.S. PATENT DOCUMENTS

| | | | | |
|---|---|---|---|---|
| 2,037,830 A | | 4/1936 | Staley | |
| 2,084,686 A | * | 6/1937 | Howard | 173/188 |
| 2,848,196 A | * | 8/1958 | Simmonds | 175/52 |
| 2,969,121 A | * | 1/1961 | Wallace | 173/33 |
| 2,969,844 A | * | 1/1961 | Wellington | 173/46 |
| 3,082,473 A | | 3/1963 | West | |
| 3,169,415 A | * | 2/1965 | Welty | 408/59 |
| 3,186,261 A | * | 6/1965 | Howard et al. | 408/111 |
| 3,293,952 A | | 12/1966 | Fairbanks | |
| 3,516,503 A | * | 6/1970 | Schaller, Jr. et al. | 175/6 |
| 3,527,362 A | | 9/1970 | Allen | |
| 4,094,612 A | * | 6/1978 | Krieg | 408/92 |
| 4,099,579 A | | 7/1978 | Stormon | |
| 4,105,358 A | | 8/1978 | Walker | |
| 5,213,169 A | * | 5/1993 | Heller | 175/122 |
| 5,697,834 A | | 12/1997 | Heumann et al. | |
| 6,257,221 B1 | | 7/2001 | Shibuya | |
| 7,210,878 B2 | | 5/2007 | Koslowski et al. | |
| 2006/0291970 A1 | * | 12/2006 | Granger | 409/137 |

FOREIGN PATENT DOCUMENTS

| | | | |
|---|---|---|---|
| EP | 638389 A1 | * | 2/1995 |
| GB | 2092925 A | * | 8/1982 |
| JP | 09300338 A | * | 11/1997 |
| JP | 2007199059 A | * | 8/2007 |

* cited by examiner

*Primary Examiner* — Daniel Howell
(74) *Attorney, Agent, or Firm* — Reed Smith LLP; William J. McNichol, Jr.; Carl H. Pierce

(57) ABSTRACT

The present invention is a coring unit adapted to be engaged to an articulated arm, to reduce the labor necessary for on-site coring of sewage and water pipes. The coring unit includes a frame containing the components of the unit, which include a coring bit, a coring bit motor, a traverse mechanism, and a stabilizer for allowing ready orientation of the coring unit with respect to an object being cored. The unit may also he provided with a traverse motor for driving the coring bit into an object being cored, and for withdrawing the coring bit once a core has been formed. The coring unit may additionally be adapted to allow for remote operation of the coring unit.

9 Claims, 4 Drawing Sheets

PORTABLE CORING MACHINE

BACKGROUND

The present invention relates to the creation of holes in pipes for forming junctions, and more particularly, to the forming of holes in concrete pipes for joining pipe branches in situ.

Building developments require underground piping for various functions, including sewage and storm water run off. These pipe systems are formed by joining pipes within trenches, where the pipes can he readily buried below ground level to provide a smooth ground surface within the development, such as to allow roads to pass over the pipes.

These pipes may typically be formed of concrete sections, and have diameters up to several feet in diameter. Each pipe section is accordingly quite large and heavy. The size and weight of the pipes limits the ability to precisely pre-drill holes in the sides of the pipes to allow branch pipes to be joined. Forming the hole may be easier outside of a trench, however the added requirements for precise placement of the pipe, in the proper orientation to expose the pipe, limit the efficiency with which a pipe system can be installed.

Pipe systems are typically installed by first forming a trench in which the pipe is to lay. Sections of pipe are then placed into the trench, and joined together. A drill or coring machine may then be lowered into the trench, or a branch trench, and fixed to the pipe, such that a hole or core may be formed in the proper location in a sidewall of a pipe. Since the forces associated with creating the core are high, the coring machine must be properly rigged to remain in place while a core is formed. This process is time and labor consuming, and reduces the speed with which a pipe system can be emplaced.

Present coring machines typically use a hydraulic motor to turn a coring bit. The coring bit is similar to a hole saw, however uses a diamond edge to cut the concrete of the pipe being cut, The coring machine typically requires a hydraulic pump to be located near the coring machine to provide high pressure hydraulic fluid for powering the hydraulic motor. The diameter of coring bits are typically in the range of 3"-18", however the size of the core that may be formed is more limited by the power, and reaction torque, required to turn the coring bit, Mounting a drill on an articulated arm is known in the art. For example, U.S. Pat. No. 4,099,579 discloses mounting a mast mounted drill rig on an articulated arm. in the '579 patent, a conventional drill is shown mounted through a trunnion to the articulated arm of a back hoe. The mast assembly includes a traverse mechanism for driving the drill into a substance being drilled. The mast mounted system shown, however, is not well adapted to the role of coring pipes, adaptations which the present invention addresses.

SUMMARY OF THE INVENTION

The present invention may be embodied in a pipe coring unit that is adapted to be engaged to an articulated arm. The coring unit may include a frame within which a coring bit is contained. The coring bit may be engaged to a motor for rotating the coring bit. A traverse mechanism may be provided to allow the coring bit to be advanced into a pipe being cored. A coolant sprayer may be included to provide flow of a coolant onto the coring bit to cool the coring bit during operation. A stabilizer for properly orienting the coring unit with respect to a pipe being cored may also be provided. Each of the components may be mounted to the frame.

DETAILED DESCRIPTION OF THE INVENTION

Figure 1:
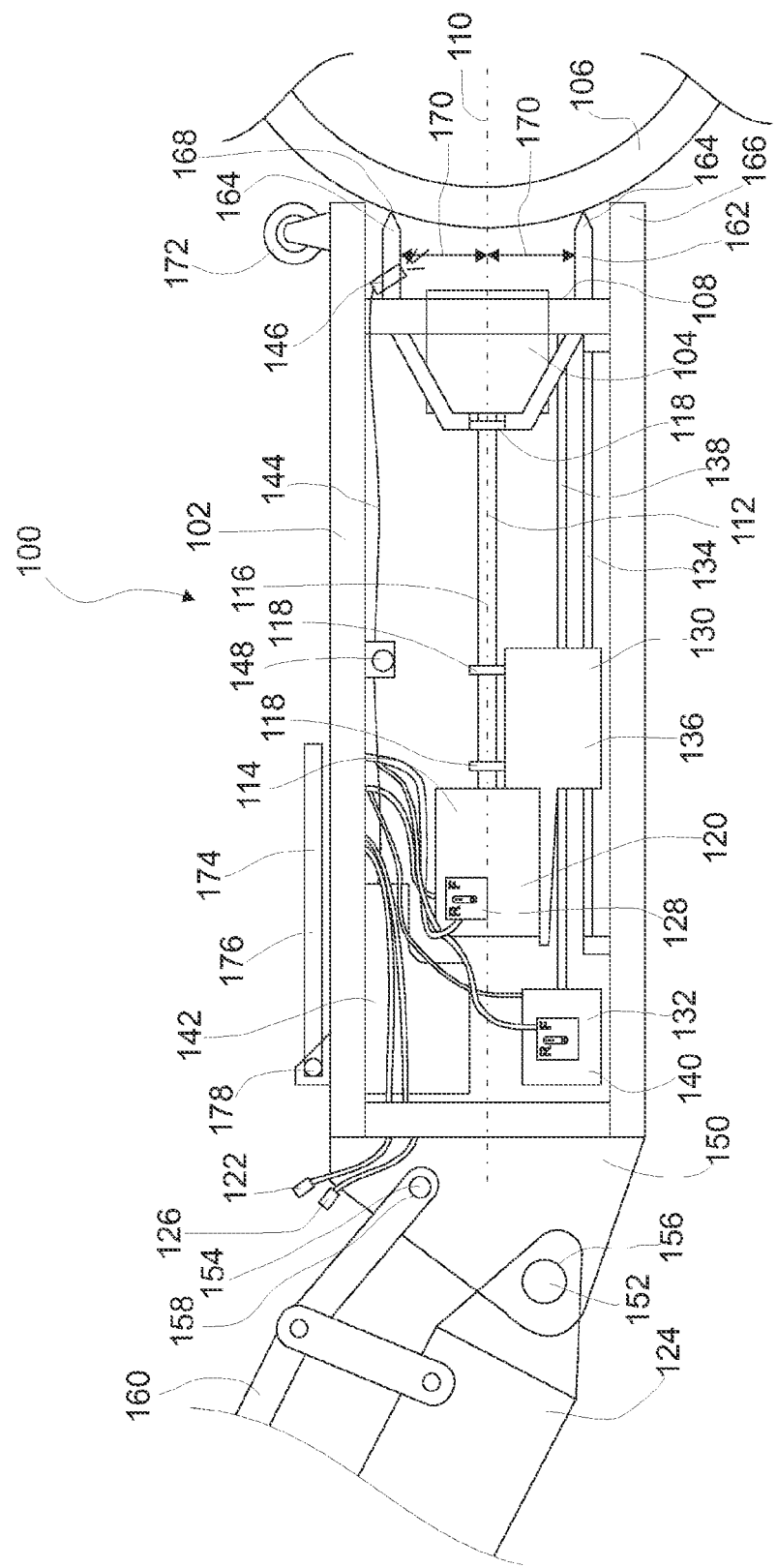
FIG. 1 illustrates an embodiment of the present invention, in which the coring unit is attached to an articulated arm, such as may be associated with a back hoe.

The Figures show an embodiment of the present invention, in which like numerals are used to identify like elements. In FIG. 1, there is shown a coring unit 100 according to the present invention. A frame 102 is provided such that components which comprise the coring unit 100 may be contained within the frame 102, such that when the coring unit 100 is lowered into a trench, the frame 102 protects the components.

The coring unit 100 may include a coring bit 104 for creating a hole into a pipe 106. The coring bit 104 may be selected from those commonly used in the industry. The coring bit 104 may be positioned within the frame 102 such that the coring bit 104 is behind the front face 108 of the frame 102 when in a rearmost position. The coring bit 104 may be oriented such that the coring axis 110 of the coring bit 104 is parallel to a traverse axis 112 along which the coring bit 104 can be traversed. As the coring bit 104 is traversed forward along the traverse axis 112, the coring bit 104 may extend beyond the frame 102, such that the coring bit 104 may engage a pipe 106 to be cored.

The coring bit 104 may be connected to a coring bit motor 114 such that the coring bit motor 114 turns the coring bit 104 when in operation. A driveshaft 116 may be disposed between the coring bit motor 114 and the coring bit 104. The driveshaft 116 may be supported by bearings 118 to ensure correct positioning of the coring bit 104 within the frame 102.

The coring bit motor 114 may be a hydraulic motor 120. An intake port 122 may be provided such that hydraulic fluid under pressure may be supplied to the coring bit motor 114 from a source, i.e., a hydraulic pump, associated with the articulated arm 124. Such pressurized hydraulic fluid is typically present on articulated arms 124, such as may be associated with a back hoe, in order to effect motion of the articulated arm 124. A return port 126 may also be provided between the hydraulic motor 120 and the articulated arm 124 such that the hydraulic fluid may be returned to the hydraulic pump associated with the articulated arm 124. A control valve 128 for allowing the hydraulic motor 120 to be turned on or off may additionally be provided.

The coring bit 104 may be connected to a traverse mechanism 130 to allow the coring bit 104 to be traversed fore and aft. A traverse motor 132 may be provided to move the traverse mechanism 130, and may also be a hydraulic motor, and may be connected directly to the traverse mechanism 130, or may be connected to the coring bit 104 through a slip driveshaft that allows the traverse motor 132 to be fixed to the frame 102, while the coring bit 104 is allowed to move fore and aft with the traverse mechanism 130.

The traverse mechanism 130 may consist of one or more linear slides 134 on which a slide block 136 is mounted. Positioning of the slide block 136 may be controlled, such as through an acme screw 138 connected to the traverse motor 132. The traverse motor may be a second hydraulic motor which is reversible. The hydraulic fluid high pressure supply and return may be connected to the intake and return ports 122, 126 for the coring bit hydraulic motor 120. A reversible valve 140 for controlling the traverse motor 132 may be supplied, such that the acme screw 138 may be rotated in either direction to alternately advance or retract the coring bit 104. Position limits may be incorporated to limit the travel of the traverse mechanism 130 by interrupting the supply of pressurized hydraulic fluid to the traverse motor 132.

Although the motors shown utilize hydraulic motors, electrical or pressurized air driven (pneumatic) motors may be substituted. Where electrical motors are used, a power receptacle may be substituted for the intake and return ports. Where an air driven motor is used, the intake port may be used to receive pressurized air from a source associated with the articulated arm, with the return port deleted, as the pressurized air will typically be vented to the atmosphere by the air driven motor. Although it may be more efficient to use the same type of motor for both the coring bit and the traverse mechanism, the motor types may be mixed as desired.

A coolant reservoir 142 may be provided to hold coolant for use by the coring unit 100. The coolant reservoir 142 may he connected via a tube 144 with a coolant sprayer 146 positioned to spray coolant onto the coring bit 104 when the coring bit 104 is being used to core a pipe 106. The coolant may be water, or may be another type of fluid chosen to cool the coring bit. Coolant may be transferred from the coolant reservoir 142 to the coolant sprayer 146 by gravity feed, by the provision of a coolant pump, or by pre-pressurizing the coolant reservoir such that pressure in the reservoir 142 forces coolant to the coolant sprayer 146. A coolant spray control valve 148 may also be provided to allow the flow of coolant to be impeded.

The frame 102 may be adapted such that it may be mounted to an articulated arm 124. The adaptation may consist of a trunnion 150 or other structure to allow the coring unit 100 to be connected via two parallel rotational degrees of freedom 152, 154. For example, a main pin 156 may be used to join the trunnion 150 to an articulated arm 124, such that the frame 102 is able to rotate about the pin 156 relative to the articulated arm 124. A second pin 158 may be provided such that the frame 102 may be connected to a hydraulic ram 160 associated with the articulated arm 124 to force the coring unit 100 to rotate about the main pin 156. The main pin 156 and the second pin 158 may preferably be selected such that the pins 156, 158 can be readily removed from the trunnion/articulated arm joint, such that the coring unit 100 may be readily separated from the articulated arm 124. The pins 156, 158 may be bolts to which a retaining nut may be attached, clevis pins to which a retainer can be attached, or other suitable structures known to a person of skill in the field.

The coring unit 100 may have a front face 108 for positioning against a pipe 106 to be cored. The front face 108 may have a stabilizer 162 formed thereon to allow proper orientation of the coring unit 100 to a pipe 106 to be cored. The stabilizer 162 may be formed from four positioning pins 164, with the positioning pins 164 spaced equally from the coring axis 110 such that the coring bit 104 is maintained in a position perpendicular to the pipe 106 when all four of the pins 164 are in contact with a pipe 106 to be cored.

These positioning pins 164 are shown in greater detail in FIG. 2, discussed further below.

The frame 102 may have feet 166 which extend just past the outer extent 168 of the positioning pins 164, such that the coring unit 100 may be place on a flat surface, with the outer extent 168 of the positioning pins 164 out of contact with the flat surface. The lateral spacing 170 of the positioning pins 164 may be selected based on the diameter of the pipe 106 to be cored. This selection may typically be chosen based on the diameters of pipes that the particular coring unit 100 has been adapted to core. For example, lateral distances greater that the radius of the pipe would not be effective, as they would not be able to center a pipe with respect to the coring unit 100.

Rollers 172 may be provided to allow the coring unit 100 to be rolled when not attached to an articulated arm 124. The rollers 172 may be located on the frame 102 such that when the coring unit 100 is placed within a trench to core a pipe 106, the rollers 172 are located on the top of the coring unit 100, such that the rollers 172 do not impede the positioning of the coring unit 100 within a trench.

Foldable handles 174 may be provided such that the handles 174 can be folded out from the frame 102 when the frame 102 is detached from an articulated arm 124, to assist in transportation of the coring unit 100. The handles 174 may be a pair of arms 176 that are pivotably hinged to the frame 102, such that they can be rotated against the frame 102 when not in use, but rotated away from the frame 102 when needed. Stops may be provided to limit rotation of the handles 174 away from the frame 102, or alternately, the hinge point 178 of the handles 174 may he selected such that the handles 174 can be rotated around the hinge point 178 until the frame 102 acts as a stop.

Figure 2:
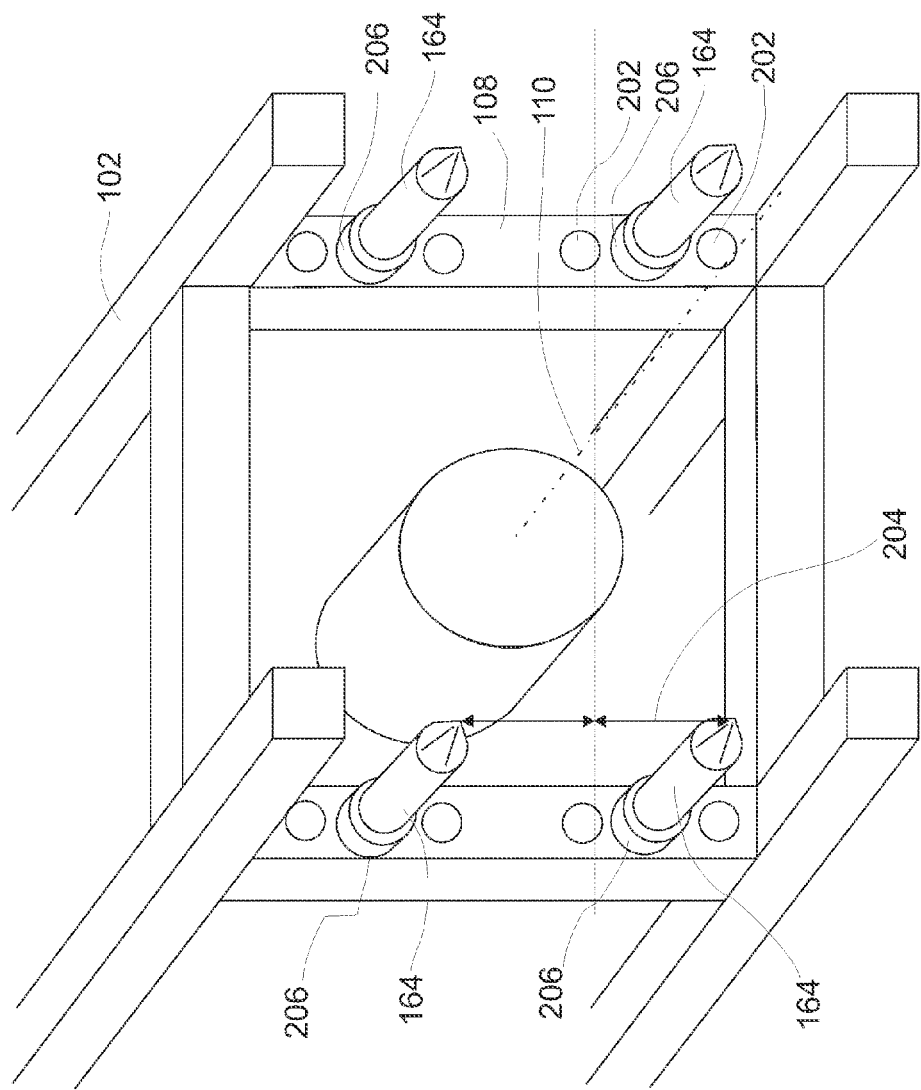
FIG. 2 illustrates the front face of a coring unit according to the present invention, showing the location of positioning pins.

As shown in FIG. 2, the positioning pins 164 may extend from a face 108 of the frame 102. The pins 164 may he connected to the frame 102 through apertures in the frame 102, such that the pins 164 can be readily removed. Additionally, multiple apertures 202 may be provided, such that the lateral distance 204 of the positioning pins 164 from the coring axis 110 may be changed based on the diameter of pipe to be cored. Reducing the lateral distance 204 allows smaller pipes to be cored, while increasing the lateral distance 204 increases the stability of the coring unit with respect to a pipe to be cored.

One or more pressure sensors 206 may be provided to determine the amount of force being applied to an object being cored by the positioning pins 164. Such force may be significant, in order to prevent motion of the coring unit 100 relative to the pipe.

Figure 3:
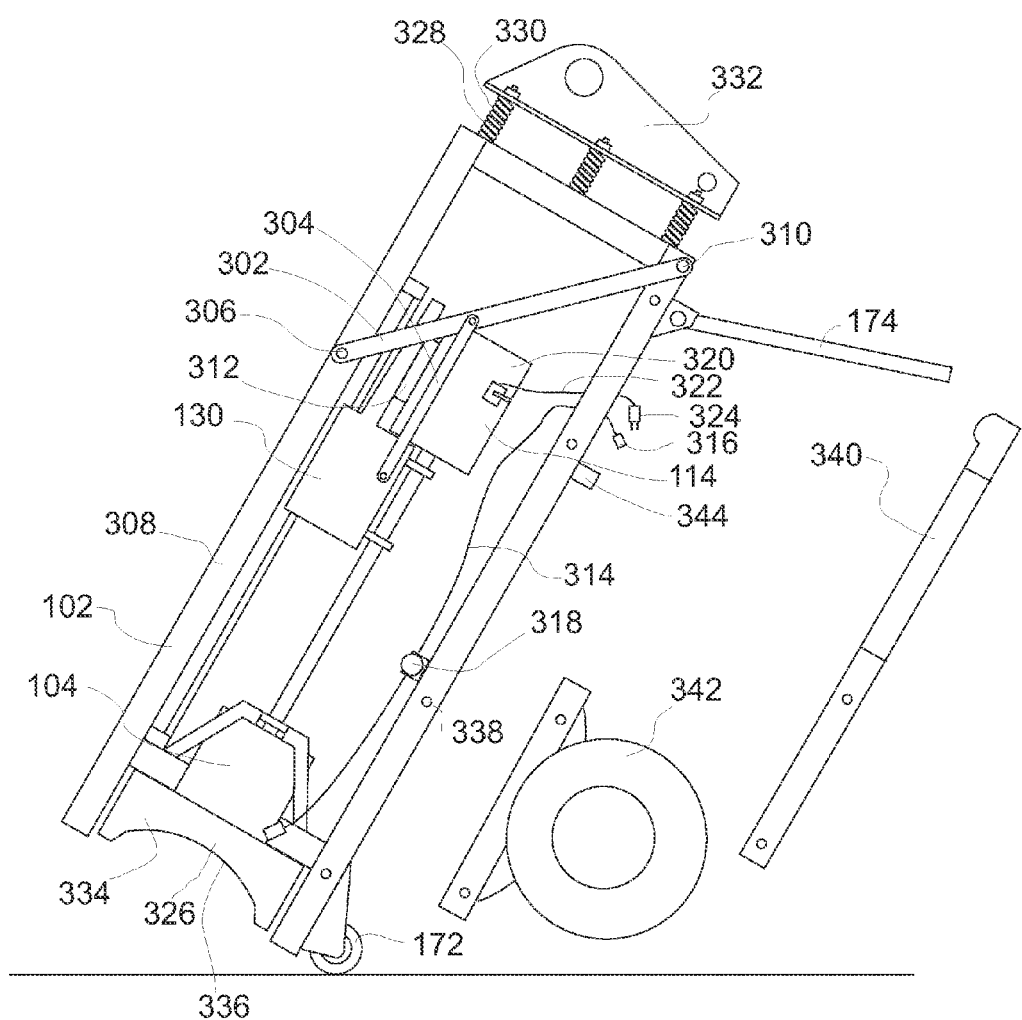
FIG. 3 illustrates an alternate embodiment of the present invention, shown in a travel configuration.

A variation of the coring unit is shown in FIG. 3. Rather than utilizing a traverse motor, manual control for traverse may be provided through the use of a lever arm 302 connected to a traverse block 130. By the use of an intermediate link 304, force multiplication can be preserved, while still implementing a simple mechanism. A pivot point 306 may be provided on a lower member 308 of the frame, such that moving a handle 310 on the opposite end of the lever arm 302 results in rotation of the lever arm 302 about the pivot point 306. Such motion may move the intermediate link 304, which as a result of a link to the traverse block 130, results in motion of the traverse block 130 in a fore or aft direction as desired.

Alternately, a handwheel for controlling an acme screw may be provided, such that rotation of the hand crank results in the coring bit being advanced or withdrawn. The handle may preferably be connected to the acme screw via a reduction gear, such that multiple turns of the hand crank may be required to advance the coring bit, providing mechanical advantage for an operator advancing the coring bit using the hand crank.

The coring bit motor 114 may be mounted to the traverse mechanism 130 by a device 312 to sense the force being applied by the coring bit 104 to an object being cored. Such a device 312 may be a load cell, such that forces being applied through the coring bit 104 can be sensed, and a calibrated output provided to a remote monitor.

Additionally, as shown, the coolant sprayer 146 may be supplied via a tube 314 and a coolant port 316 for receiving coolant from a source associated with the articulated arm (not shown.) Again, a flow control valve 318 may be provided such that flow of coolant can be turned off, to conserve coolant for only during times in which the coring bit 104 is being used to core a pipe.

The coring bit motor 114 may be an electrical motor 320, with a power cord 322 connecting the motor 320 to an electrical power receptacle 324. If a coolant reservoir is included within the coring unit, the only external power requirement would be an electrical source, minimizing the feeds necessary from an articulated aim.

The engagement between the coring unit 100 and the articulated arm may be fabricated such that some elasticity exists between the articulated arm and the coring unit 100, such that the coring unit 100 can move relative to the articulated arm such that the stabilizer 326 can properly position the coring unit 100 relative to an object being cored. An elastic element 328 may be formed through high rate springs 330 positioned between the frame 102 and the trunnion 332. Such springs 330 would need to have a high enough spring rate such that the coring unit 100 would be substantially fixed relative to the trunnion when the coring unit 100 is supported by an articulated arm, but have enough elasticity such that deflections are possible when the coring unit 100 is pressed against an object to be cored.

An optional form of the stabilizer 326 is also shown in FIG. 3, such that the stabilizer 326 is formed from one or more plates 334 having a contour 336 selected to engage the surface being cored. The plates 334 may be adapted to be readily swapped from the frame 102, such that appropriate contours 336 may be readily implemented for different objects being cored.

Finally, the coring unit 100 is shown in a travel configuration in

FIG. 3, with the handle 174 extended, and the coring unit 100 tilted such that the weight of the coring unit 100 is supported on the roller 172. Such a configuration allows the coring unit 100 to be readily moved around a job site. Finally, provisions for towing the coring unit 100 may additionally be implemented, such as apertures 338 through the frame 102 to allow a tow hitch 340 and a road suitable set of wheels 342 to be engaged to the coring unit 100. A retainer 344 may be provided to retain the handle or handles 174 in a stowed position during travel when a hitch 340 and road wheels 342 are mounted.

Figure 4:
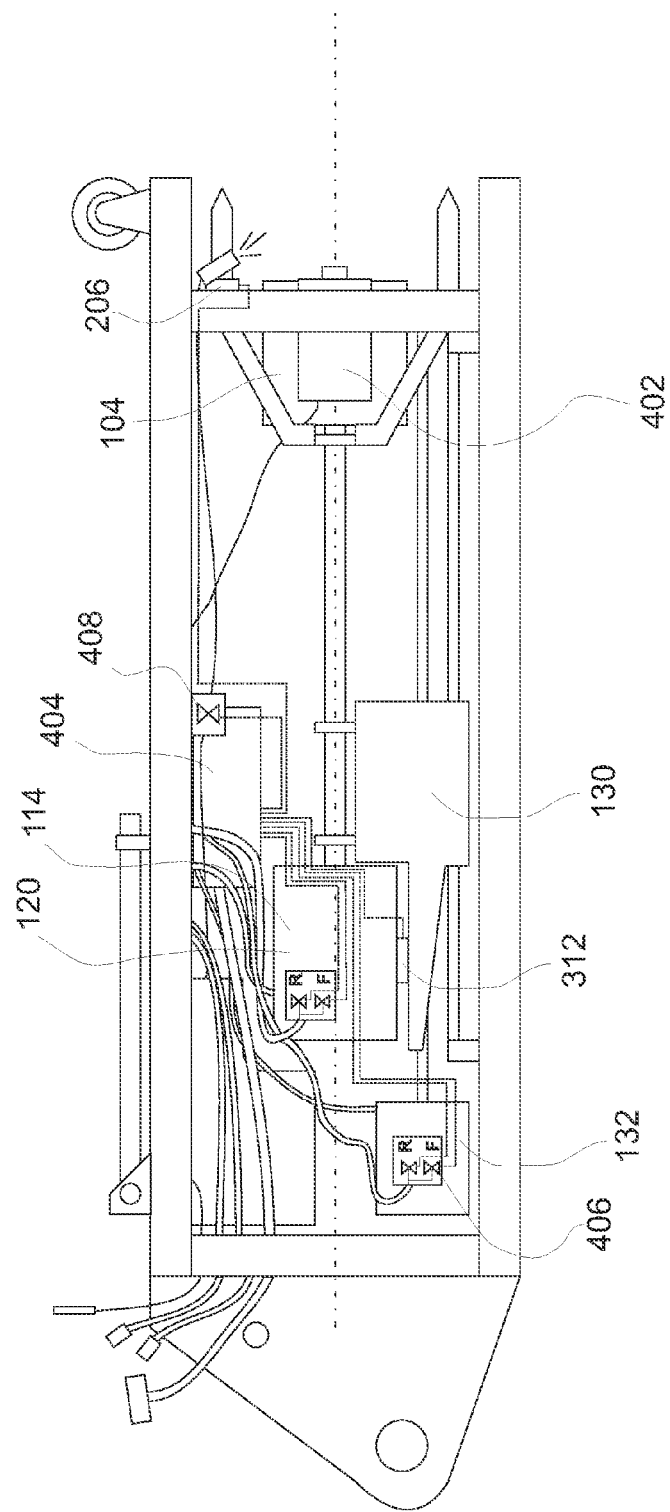
FIG. 4 illustrates an embodiment of the present invention, showing controls that may be associated with the coring unit to allow remote operation of the coring unit.

FIG. 4 illustrates an embodiment of the present invention, adapted to be operated via a remotely located set of controls, such as controls located on a tractor to which a back hoe arm is mounted. The system shown in FIG. 4 utilizes a hydraulic coring bit motor 120 and a hydraulic traverse motor 132. Again, the system may be readily modified to utilize electrical motors or high pressure air motors.

The system may include a pressure sensor 206 for measuring the pressure being applied through position pins 164 against an object being cored, as well as a load sensor 312 to measure the pressure being applied by the coring bit 104 against the object being cored. A video camera 402 may additionally be provided to allow a remote operator to have a clear view of the object in the area where the core is being formed.

An interface box 404 may be provided to allow control signals received from a remote control station (not shown) to be applied to the functions of the coring unit 100, such as forward and reverse rotation of the coring bit 104, forward and aft translation of the traverse mechanism 130, and coolant flow. The use of hydraulic motors allows a simple system of electrically controlled valves 406 to be used to control these functions. An additional valve 408 for coolant flow may be provided to control flow of coolant only when the coring bit 104 is advancing Additional functionality can be built into the interface 404, such as the control of the coolant flow based on advancement of the coring bit 104. Logic built into the interface box 404 can detect when the traverse motor 132 is advancing the traverse mechanism 130, and the coring bit motor 114 is rotating. Additionally, the output of the load sensor 312 may be used to act as a safety limit to prevent over-forcing the coring bit 104 into the object being cored, based on the force being sensed by the load sensor 312.

While the present discussion addresses the interface box 404, with its associated functionality, being located on the coring unit 100, it may be preferable to locate the interface box 404 remotely, i.e., with the control unit, such that the interface box 404 would not be exposed to the harsh environment in which the coring unit 100 will typically be used. Such an implementation would simply hardwire the control signals necessary from the remotely located interface unit 404 to the coring unit 100. Such an implementation is made simpler by limiting the functions implemented within the coring unit 100 itself, as a means of reducing the number of control leads necessary to be wired from the articulated arm 124 to the coring unit 100 itself.

Finally, positioning of the coring unit 100 relative to a desired coring location may be assisted through pre-marking of contact points for the positioning pins 164. Such pre-markings may be beneficial where a video camera is being used to allow a remotely positioned operator of the articulated arm 124 to visualize placement and orientation of the coring unit. Multiple cameras 402 may be provided where the result is beneficial. Templates may be provided based on the geometry of the positioning pins to allow targets for the positioning pins to be placed on the object to be cored. The template may be a simple laminated plastic stencil having a marking for the center of the location to be cored, as well as reference points for where the positioning pins should contact the object to be cored, The present invention may be embodied in other specific forms without departing from the spirit or essential attributes of the invention. Accordingly, reference should be made to the appended claims, rather than the foregoing specification, as indicating the scope of the invention.

What is claimed is:

1. A pipe coring unit, said coring unit being adapted to be engaged to an articulated arm, with said coring unit comprising:

a frame, a coring bit, a motor for rotating the coring bit, a traverse mechanism, a coolant sprayer, and a stabilizer mounted to said frame;

wherein said coring bit is connected to said motor for rotating the coring bit;

said coring bit further being mounted to said traverse mechanism;

said traverse mechanism having a traverse axis; and wherein said coring bit is oriented substantially parallel to said traverse axis;

wherein said stabilizer orients said coring unit against a face of an object to be cored such that said traverse axis is substantially perpendicular to said face of said object; and wherein said frame is adapted to be engaged to an articulated arm; and wherein said frame forms a protective cage around said coring bit, said motor for rotating the coring bit, and said traverse mechanism.

2. A pipe coring unit, said coring unit being adapted to be engaged to an articulated arm, with said coring unit comprising:

a frame, a coring bit, a motor for rotating the coring bit, a traverse mechanism, a coolant sprayer, and a stabilizer mounted to said frame;

wherein said coring bit is connected to said motor for rotating the coring bit;

said coring bit being mounted to said traverse mechanism;

said traverse mechanism having a traverse axis; and wherein said coring bit is oriented substantially parallel to said traverse axis;

wherein said stabilizer orients said coring unit against a face of an object to be cored such that said traverse axis is substantially perpendicular to said face of said object; and wherein said frame is adapted to be engaged to an articulated arm;

wherein said coring unit frame comprises at least one roller, said roller allowing said coring unit to be readily moved when detached from an articulated arm;

further comprising at least one handle for maneuvering said frame when said frame is detached from an articulated arm; and wherein said handle is foldable against said frame, and extendable for use in maneuvering said frame when said frame is detached from an articulated arm.

3. A pipe coring unit, said coring unit being adapted to be engaged to an articulated arm, with said coring unit comprising:

a frame, a coring bit, a motor for rotating the coring bit, a traverse mechanism, a coolant sprayer, and a stabilizer mounted to said frame;

wherein said coring bit is connected to said motor for rotating the coring bit;

said coring bit being mounted to said traverse mechanism:

said traverse mechanism having a traverse axis; and wherein said coring bit is oriented substantially parallel to said traverse axis;

wherein said stabilizer orients said coring unit against a face of an object to be cored such at said traverse axis is substantially perpendicular to said face of said object; and wherein said frame is adapted to be engaged to an articulated arm;

wherein said coring unit frame comprises at least one roller, said roller allowing said coring unit to be readily moved when detached from an articulated arm; and further comprising a trailer hitch for engaging said frame to a trailer mount on a vehicle when said frame is detached from an articulated arm.

4. A pipe coring unit, said coring unit being adapted to be engaged to an articulated arm, with said coring unit comprising:

a frame, a coring bit, a motor for rotating the coring bit, a traverse mechanism, a coolant sprayer, and a stabilizer mounted to said frame;

wherein said coring bit is connected to said motor for rotating the coring bit;

said coring bit being mounted to said traverse mechanism;

said traverse mechanism having a traverse axis; and wherein said coring bit is oriented substantially parallel to said traverse axis;

wherein said stabilizer orients said coring unit against a face of an object to be cored such at said traverse axis is substantially perpendicular to said face of said object; and wherein said frame is adapted to be engaged to an articulated arm;

wherein said motor for rotating the coring bit is a hydraulic motor, and wherein said coring unit further comprises a hydraulic fluid port connected to said hydraulic motor for receiving pressurized hydraulic fluid from a source associated with said articulated arm;

wherein said traverse mechanism is powered by a reversible traverse motor, said traverse motor driving said traverse mechanism fore and aft along said traverse axis;

wherein said traverse motor is a hydraulic motor, and wherein said traverse hydraulic motor receives pressurized hydraulic fluid from said hydraulic fluid port: and further comprising a hydraulic controller for controlling said motor for turning said coring bit and said traverse motor, said hydraulic controller having a controller interface for receiving control signals from a control source associated with said articulated arm.

5. The coring unit of claim 4, further comprising a video camera and a video camera output port, said output port for transmitting output from said video camera to a remotely located monitor.

6. The coring unit of claim 4, further comprising a force sensor for measuring force being applied by said stabilizer against a pipe to be cored.

7. The coring unit of claim 6, wherein said force sensor transmits a sensed amount of force to said control source associated with said articulated arm.

8. The coring unit of claim 4, further comprising a traverse force sensor, said traverse force sensor sensing the force being applied by a coring bit against a pipe being cored.

9. The coring unit of claim 4, comprising a coolant controller, said coolant controller regulating the flow of a coolant such that said coolant sprayer only sprays coolant when said traverse mechanism is advancing.

* * * * *